United States Patent
Galbreath et al.

(10) Patent No.: US 9,019,676 B2
(45) Date of Patent: Apr. 28, 2015

(54) SYSTEM AND METHOD FOR PROTECTING AN APPLIANCE JUNCTION

(71) Applicant: General Electric Company, Schenectady, NY (US)

(72) Inventors: Patrick D. Galbreath, Louisville, KY (US); Craig Lung-Pei Tsai, Louisville, KY (US); Almir Begovich, Louisville, KY (US); Gregory Michael Thomas, Louisville, KY (US); Jonathan D. Nelson, Louisville, KY (US); John Michael Todd, Louisville, KY (US); Robert Jules Lafleur, Louisville, KY (US); Brice Alan Bowley, Goshen, KY (US)

(73) Assignee: General Electric Company, Schenectady, NY (US)

( * ) Notice: Subject to any disclaimer, the term of this patent is extended or adjusted under 35 U.S.C. 154(b) by 164 days.

(21) Appl. No.: 13/736,255

(22) Filed: Jan. 8, 2013

(65) Prior Publication Data
US 2013/0293996 A1    Nov. 7, 2013

Related U.S. Application Data

(60) Provisional application No. 61/641,086, filed on May 1, 2012.

(51) Int. Cl.
*H02H 7/00* (2006.01)
*H02H 3/08* (2006.01)

(52) U.S. Cl.
CPC ..................... *H02H 3/08* (2013.01)

(58) Field of Classification Search
USPC ............................................. 361/93.8
See application file for complete search history.

(56) References Cited

U.S. PATENT DOCUMENTS

| | | | |
|---|---|---|---|
| 5,021,915 A | 6/1991 | Wandler et al. | |
| 7,858,907 B2 * | 12/2010 | Nawrot et al. | 219/494 |
| 7,859,813 B2 | 12/2010 | Cline et al. | |
| 8,014,115 B2 * | 9/2011 | Vicente et al. | 361/93.1 |
| 8,068,727 B2 | 11/2011 | Phillips et al. | |
| 8,258,442 B2 | 9/2012 | Miller et al. | |

* cited by examiner

*Primary Examiner* — Stephen W Jackson
(74) *Attorney, Agent, or Firm* — Global Patent Operation; Douglas D. Zhang

(57) ABSTRACT

A system for protecting an electrical junction having a first pin and a second pin is provided. The system includes a first circuit protection device coupled to the first pin and configured to sense at least a first current and a second circuit protection device coupled to the second pin and configured to sense at least a second current. Each of the first circuit protection device and the second circuit protection device includes a trip mechanism configured to interrupt current flowing through a respective circuit protection device and a trip unit operatively coupled to the trip mechanism. The trip unit is configured to activate the trip mechanism based on a determination that a respective current exceeds a predetermined threshold.

20 Claims, 3 Drawing Sheets

SYSTEM AND METHOD FOR PROTECTING AN APPLIANCE JUNCTION

CROSS REFERENCE TO RELATED APPLICATIONS

This application claims the benefit of U.S. Provisional Application No. 61/641,086 filed May 1, 2012, which is hereby incorporated by reference in its entirety.

BACKGROUND OF THE INVENTION

The field of the disclosure relates generally to appliance protection systems and more specifically to systems and methods for protecting an appliance junction from the high heat and current of an over-current/over-temperature event.

In residential electrical wiring, three-wire 220/240 Volt circuits (referred to herein as 240 Volt circuit) are conventionally employed for large consumer appliances. Appliances which use current from a 240 Volt circuit (such as electric water heaters and air conditioners) also have three wires. A black wire, often known as the first "hot" wire, supplies current at 120 volts from a power source (e.g., a public utility or an electrical generator) to an electrical load (e.g., a compressor motor, a pump motor, or a heating element depending on the type of appliance) connected to the power source. A second "hot" wire, which may be blue, red, or white, also supplies current in to the load at 120 volts.

The first and second hot wires connect to the load at an electrical junction typically having three pins. Such an electrical junction is also interchangeably referred to herein as an appliance junction, or simply a junction. The first and second hot wires connect to first and second pins of the junction, respectively. A third wire, called a "common" wire serves the function of completing the electrical circuit back to the power source. The third wire connects to a third pin of the junction.

A temperature limiting or regulating device is conventionally attached only to the first hot wire for providing protection against over-current events. More specifically, each pin of the junction includes a metal wire insulated by glass. During an over-current or over-temperature event, the insulating glass may heat up and melt or otherwise fail. Known temperature limiting and regulating devices typically include a trip unit that controls the flow of current to the junction inside the appliance based upon temperature or current level flowing through the device. More specifically, the trip unit causes current flowing through the circuit breaker to be interrupted if the temperature or current is outside of acceptable conditions.

In conventional 220/240 Volt appliances employing electrical loads, such as a compressor in an air conditioner, the electrical junction pins (e.g., FUSITE® pins) ("Fusite" is a registered trademark of Emerson Electric Co. of St. Louis, Mo.) on the compressor are isolated from the compressor shell (ground) by the glass insulator. The glass insulator also provides a hermetic seal between the junction and the pressurized compressor shell. An overload protection device is commonly employed to protect the first pin of a three pin 240V junction from damage by the high heat of an over-current or over-temperature event to satisfy UL requirements. The second pin is left unprotected because the UL standard does not require the second pin to be protected and protection on the second pin increases the cost of the appliance. An over-current or -temperature event could cause a failure of the insulating glass associated with the second pin, which may cause the second pin to short to the grounded compressor shell and fail. If the glass insulator on the second pin melts or otherwise deforms during the over-temperature conduction, oil and/or other liquids may be released from the pressurized compressor shell. As such, it is desirable to protect the junction to facilitate preventing failure of the pins of the junctions.

BRIEF DESCRIPTION OF THE INVENTION

In one aspect, a system for protecting an electrical junction having a first pin and a second pin is provided. The system includes a first circuit protection device coupled to the first pin and configured to sense at least a first current and a second circuit protection device coupled to the second pin and configured to sense at least a second current. Each of the first circuit protection device and the second circuit protection device includes a trip mechanism configured to interrupt current flowing through a respective circuit protection device and a trip unit operatively coupled to the trip mechanism. The trip unit is configured to activate the trip mechanism based on a determination that a respective current exceeds a predetermined threshold.

In another aspect, a system for protecting an electrical junction having a first pin and a second pin is provided. The system includes a first circuit protection device coupled to the first pin, a second circuit protection device coupled to the second pin, and a controller coupled to the first circuit protection device and the second circuit protection device. The first circuit protection device includes a first trip mechanism, and the second circuit protection device includes a second trip mechanism. The controller is configured to receive a signal representative of an overage event from at least one of the first circuit protection device and the second circuit protection device, and activate at least one of the first trip mechanism and the second trip mechanism based on the received signal.

In still another aspect, a method of operating a system for protecting an electrical junction is provided. The system includes a first circuit protection device coupled to a first pin of the electrical junction and a second circuit protection device coupled to a second pin of the electrical junction. The first circuit protection device is configured to sense at least a first current, and the second circuit protection device is configured to sense at least a second current. The first circuit protection device has a first trip mechanism, and the second circuit protection device has a second trip mechanism. The method includes receiving a signal representing the first current sensed by the first circuit protection device and the second current sensed by the second circuit protection device, determining, by a processor, whether at least one of the first current and the second current exceeds a predetermined current threshold, and activating, by the processor, at least one of the first trip mechanism and the second trip mechanism based on the determination.

BRIEF DESCRIPTION OF THE DRAWINGS

The present disclosure is described in detail below with reference to the attached drawing figures.

DETAILED DESCRIPTION OF THE INVENTION

The embodiments described herein can be used to protect components of an electrical junction from the effects of an over-current and/or an over-temperature event (also referred to herein as "an overage event" or "an overage condition". For example, the systems described herein include at least two circuit protection devices—one on a first hot pin of the junction and one on a second hot pin of the junction. As such, components at each pin can be protected. In contrast, known systems include a single circuit protection device on only one hot pin of an electrical junction per the industry standards (i.e., UL standards). Accordingly, known systems can only determine if the one hot pin is experiencing an overage event. However, the systems described herein can determine if either or both hot pins are experiencing an overage event. As such, the embodiments described herein protect the hot components of the junction from adverse impacts caused by over-current and/or over-temperature events.

While embodiments of the disclosure are illustrated and described herein with reference to a system for protecting electrical appliances, and more specifically to a system and method for protecting a 240V appliance junction, aspects of this disclosure are operable with any system that performs the functionality illustrated and described herein, or its equivalent.

Figure 1:
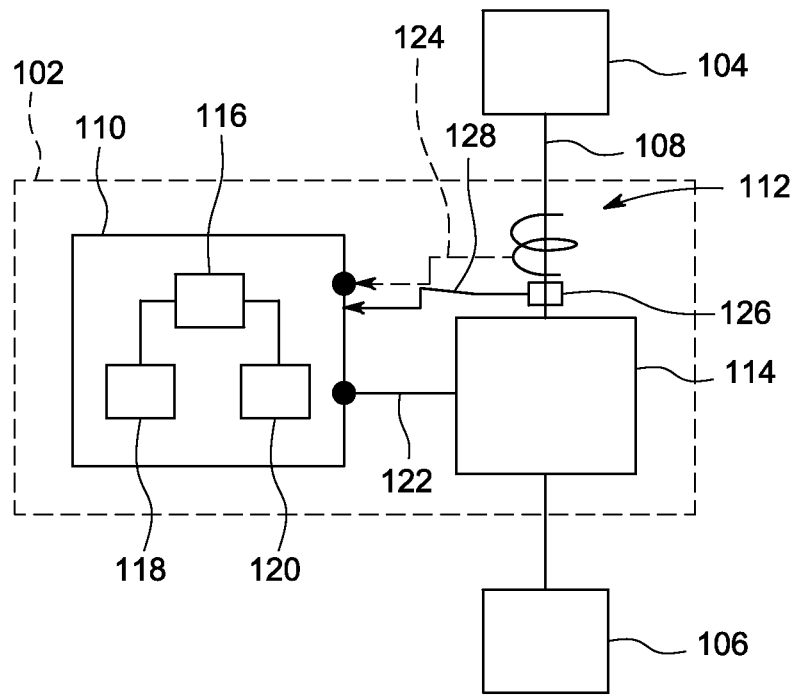
FIG. 1 is a schematic block diagram of a circuit protection device for protecting an appliance junction, according to an embodiment.

FIG. 1 is a schematic block diagram of a circuit protection device 102 for protecting an appliance junction. In one embodiment, circuit protection device 102 is positioned adjacent a compressor unit (not shown). In another embodiment, circuit protection device 102 is positioned away from a compressor unit (not shown). More specifically, the location of circuit protection device 102 depends on the type of device used as circuit protection device 102, amount of space available, access to ventilation, and/or other factors.

Circuit protection device 102 is configured to programmably control delivery of power from an electrical power source 104 to a load 106. Electrical power source 104 may be a typical 240 Volt supply from a power utility company, one or more generators, or other devices that provide electrical current to load 106. The electrical current may be transmitted to load 106 through one or more electrical distribution lines or busses 108 coupled to circuit protection devices 102. Load 106 may include, but are not limited to only including, appliances, machinery, motors, and/or other electrical and mechanical equipment.

In an exemplary embodiment, circuit protection device 102 is a circuit breaker. Alternatively, circuit protection device 102 may be any other device that enables circuit protection device 102 to function as described herein. In an exemplary embodiment, each circuit protection device 102 includes a trip unit 110 operatively coupled to a sensor 112 and a trip mechanism 114. Trip unit 110, in an exemplary embodiment, is an electronic trip unit that includes a processor 116 coupled to a memory 118 and a display device 120.

Sensor 112, in an exemplary embodiment, is a current sensor, such as a current transformer, a Rogowski coil, a Hall-effect sensor, and/or a shunt that measures a current flowing through trip mechanism 114 and/or circuit protection device 102. Alternatively, sensor 112 may include any other sensor that enables power distribution system 100 to function as described herein. In an exemplary embodiment, each sensor 112 generates a signal representative of the measured or detected current (hereinafter referred to as "current signal") flowing through an associated trip mechanism 114 and/or circuit protection device 102. In addition, each sensor 112 transmits the current signal to processor 116 associated with, or coupled to, trip mechanism 114. Processor 116 is programmed to activate trip mechanism 114 to interrupt a current provided to load 106 if the current signal, and/or the current represented by the current signal, exceeds a programmable current threshold, as described more fully herein.

Trip mechanism 114 includes, for example, one or more circuit breaker devices (not shown). Exemplary circuit breaker devices include, for example, relays, circuit switches, contact arms, and/or circuit interrupters that interrupt current flowing through the circuit breaker device to load 106 coupled to the circuit breaker device.

Processor 116 controls the operation of circuit protection device 102 and gathers measured operating condition data, such as data representative of a current measurement (also referred to herein as "current data"), from a sensor 112 associated with a trip mechanism 114 coupled to processor 116. Processor 116 stores the current data in a memory 118 coupled to processor 116. It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Memory 118 stores program code and instructions, executable by processor 116, to control circuit protection device 102. Memory 118 may include, but is not limited to only include, non-volatile RAM (NVRAM), magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included, in memory 118. Memory 118 may also be, or include, a detachable or removable memory, including, but not limited to, a suitable cartridge, disk, CD ROM, DVD or USB memory.

In an exemplary embodiment, display device 120 includes one or more light-emitting diodes (LEDs) that indicate a status of circuit protection device 102 and/or trip mechanism 114. For example, processor 116 may activate one or more components (e.g., LEDs) of display device 120 to indicate that circuit protection device 102 and/or trip mechanism 114 is active and/or operating normally, that a fault or failure has occurred, and/or any other status of trip mechanism 114 and/or circuit protection device 102. Alternatively, circuit protection device 102 does not include display device 120.

According to an embodiment, sensor 112 senses the magnitude of current flowing through electrical distribution bus 108 that is coupled to trip mechanism 114. Sensor 112 generates a current signal 124 representative of the sensed or detected current flowing through bus 108 and transmits current signal 124 to trip unit 110. Trip unit 110 is programmed to activate trip mechanism 114 based on current signal 124 by transmitting a trip signal 122 to trip mechanism 114, thus causing trip mechanism 114 to interrupt the current flow.

According to an embodiment, a sensor 126 measures heat generated by current flowing through electrical distribution bus 108 that is coupled to trip mechanism 114. Sensor 126 may be a bi-metal, thermocouple, or thermistor type sensor. Sensor 126 generates a temperature signal 128 upon sensing of an over-heating event, such as a temperature exceeding a predetermined reference temperature or the opening of a bi-metal switch. Sensor 128 transmits temperature signal 128 to trip unit 110. Trip unit 110 is programmed to activate trip mechanism 114 based on temperature signal 128 by transmitting trip signal 122 to trip mechanism 114, thus causing trip mechanism 114 to interrupt the current flow.

In the exemplary embodiment, sensor 112 and sensor 126 are integrated into the same device, such as a current-and-temperature-biased bi-metal sensor. Alternatively, sensor 112 is a current-based bi-metal sensor, and second 126 is a temperature-biased bi-metal sensor. In an alternative embodiment, sensor 112 is a current sensing circuit on a circuit board rather than being a mechanical sensor. Further, sensor 112 and/or sensor 126 can be fuses, mechanical sensors, and/or electrical sensors.

Figure 2:
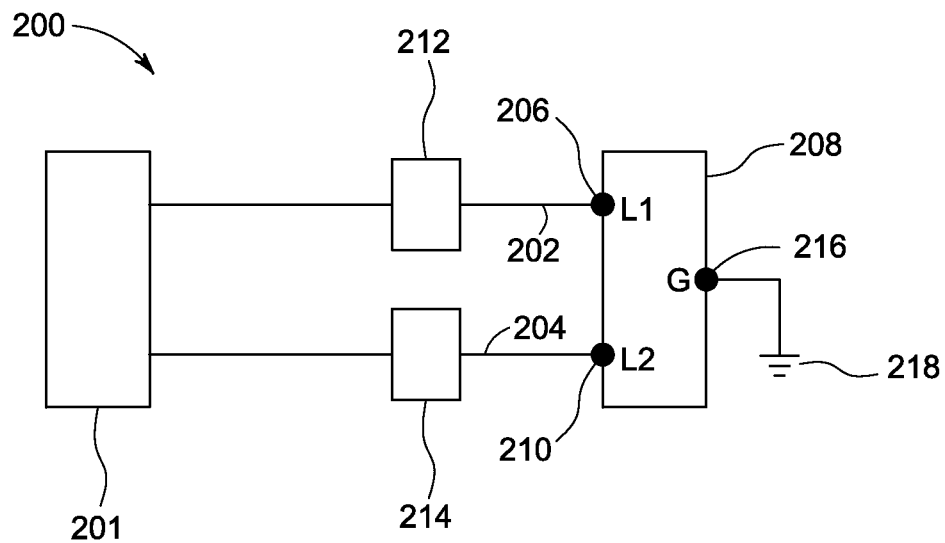
FIG. 2 is a schematic block diagram of a system for protecting an appliance junction including the circuit protection device of FIG. 1, according to one embodiment.

FIG. 2 is a schematic block diagram of an exemplary system 200 for protecting an appliance junction 208 using at least two circuit protection devices 102 (shown in FIG. 1). A load 201 is electrically connected to a first hot wire 202 and a second hot wire 204. First hot wire 202 is connected to a first pin 206 of appliance junction 208. Second hot wire 204 is connected to a second pin 210 of appliance junction 208. A common grounding pin 216 is connected to ground 218. First pin 210, second pin 212, and common grounding pin 216 form junction 208, such as an appliance junction. Though not shown in FIG. 2, it should be understood that pins 206, 210, and 216 are connected to a 240 Volt AC power supply, which may be a conventional power utility or an electrical generator.

A first circuit protection device (e.g., such as circuit protection device 102) is electrically coupled to first hot wire 202 between load 201 and first pin 206 to sense at least the current in first hot wire 202 and provide over-current current and/or over-temperature protection to junction 208. A second circuit protection device 214 (e.g., such as circuit protection device 102) is electrically coupled to second hot wire 204 between load 201 and second pin 210 to sense at least the current in second hot wire 204 and provide over-current and/or over-temperature protection to junction 208.

In the exemplary embodiment, first circuit protection device 212 is configured to sense current and temperature and second circuit protection device 214 is configured to sense a current spike. However, first circuit protection device 212 and second circuit protection device 214 can each have any suitable configuration that enables first pin 206 and second pin 210 of junction 208 to be protected from an over-current and/or an over-temperature event. As such, insulators on each pin 206 and 210 are protected from melting, deforming, or otherwise failing by interrupting power to junction 208 using a respective trip mechanism 114 (shown in FIG. 1) when an overage event is sensed at either pin 206 or 210.

Figure 3:
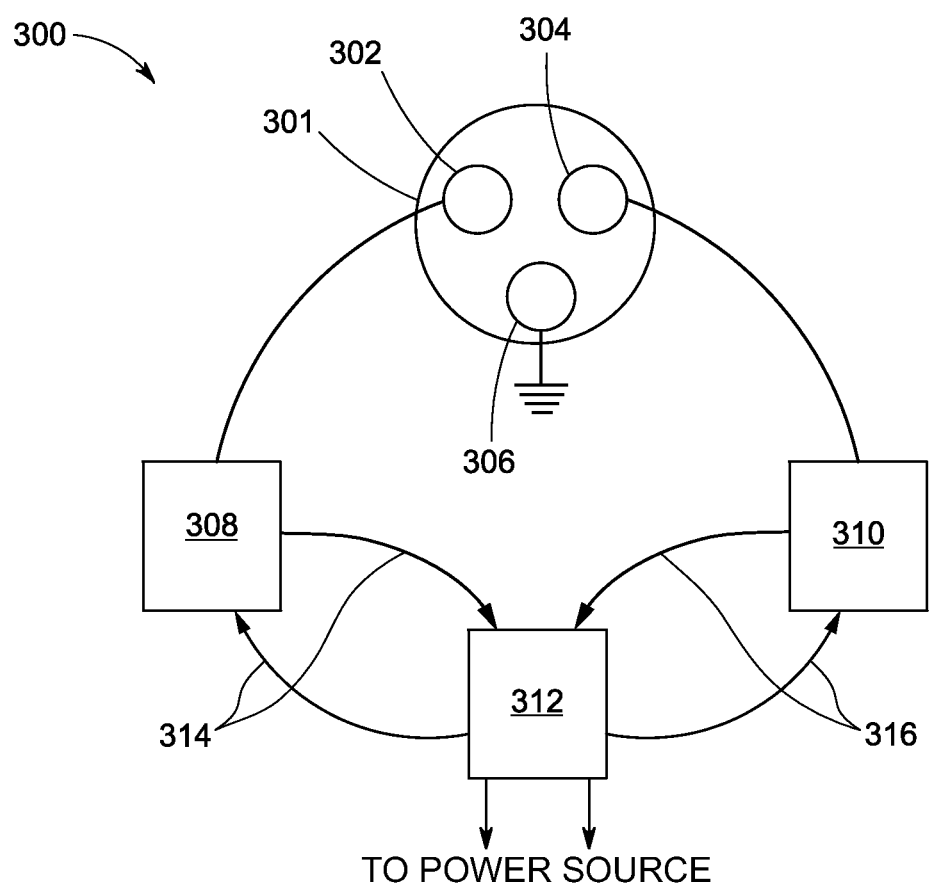
FIG. 3 is a schematic block diagram of a system for protecting an appliance junction including the circuit protection device of FIG. 1, according to an alternative embodiment.

FIG. 3 is a schematic block diagram of an alternative exemplary system 300 for protecting an appliance junction 301 using at least two circuit protection devices 102 (shown in FIG. 1). In the exemplary embodiment, system 300 is similar to system 200 (shown in FIG. 2) except system 300 includes a controller 312 and circuit protection devices are connected on a source side of junction 301 rather than on a load side of the junction, as shown in FIG. 2.

Referring to FIG. 3, a first circuit protection device 308 is connected to a first junction pin 302 between a power source and junction 301. A second circuit protection device 310 is connected to a second junction pin 304 between the power source and junction 301. A common pin 306 is connected to ground (not shown). Each circuit protection device 308 and 310 includes a current sensing device, such as sensor 112 (shown in FIG. 1), having feedback 314 and 316 with controller 312. The current sensing devices communicate a signal representative of the magnitude of the sensed current to controller 312. Although circuit protection devices 308 and 310 are shown as being separate from controller 312 in FIG. 3, circuit protection device 308 and/or circuit protection device 310 can be integrated onto the same board as controller 312

Controller 312 uses a software algorithm to determine if the magnitude of the sensed current exceeds a threshold current magnitude at which first circuit protection device 308 and/or second circuit protection device 310 are to be opened, thus breaking the flow of power at the respective circuit protection device. The threshold current magnitude is a predetermined value unique to each implementation. For example, the threshold current magnitude can be determined based on industry standards (i.e., UL standards). Depending on the type of appliance and/or the type of circuit protection device, each protection device 308 and/or 310 is mounted directly to a compressor (not shown), on a standoff (not shown), in-line with a wiring harness (not shown), or anywhere between junction 208 (shown in FIG. 2) and load 201 (shown in FIG. 2).

Because first circuit protection device 308 and/or second circuit protection device 310 can be configured to sense current and/or temperature, as described with respect to FIG. 1, controller 312 can use a software algorithm to determine if a sensed temperature exceeds a threshold temperature at which first circuit protection device 308 and/or second circuit protection device 310 are to be opened, thus breaking the flow of power at the respective circuit protection device.

Figure 4:
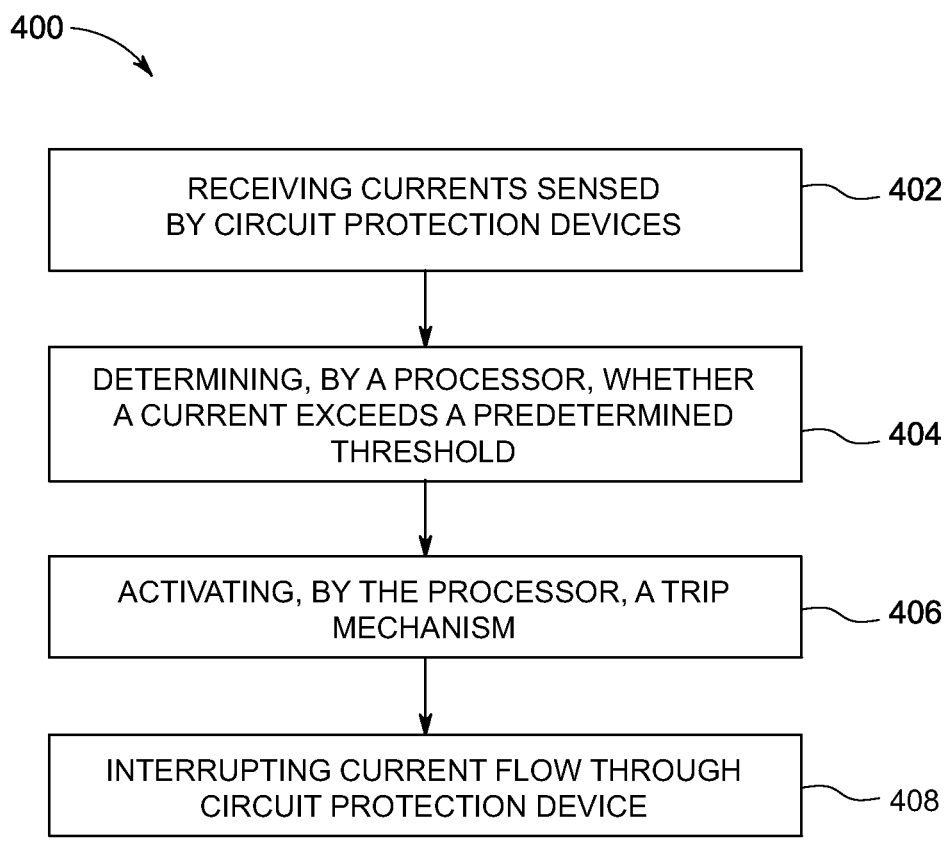
FIG. 4 is a process flow diagram of a method of operating the system for protecting an appliance junction shown in FIG. 2.

FIG. 4 is a process flow diagram of a method 400 of operating system 200 (shown in FIG. 2) and/or system 300 (shown in FIG. 3) for protecting an appliance junction 208 (shown in FIG. 2) and/or junction 301 (shown in FIG. 3). Method 400 can be used with system 200 and/or 300; however, method 400 is described below as being used with system 300 for clarity.

Referring to FIGS. 3 and 4, method 400 includes sensing the first current flowing through and/or the temperature of first circuit protection device 308 and the second current flowing through and/or the temperature of second circuit protection device 310. More specifically, processor 116 (shown in FIG. 1) and/or a processor in controller 312 (referred to collectively as the "processor") receives 402 a signal from first circuit protection device 308 and/or second circuit protection device 310 indicating a current and/or temperature sensed by a respective circuit protection device.

Based on the received signals, the processor determines 404, whether the first current/temperature and/or the second current/threshold exceeds a predetermined threshold. The predetermined threshold can be, for example, a UL maximum operating temperature, a maximum current, a maximum temperature, and/or any other suitable standard or empirically-derived threshold. If either current/temperature exceeds the predetermined threshold, the processor activates 406 trip mechanism 114 (shown in FIG. 1) of circuit protection device 308 and/or 310 associated with the excessive current or temperature. For example, if the first current exceeds a predetermined current threshold, trip mechanism 114 of first circuit protection device 308 is activated 406 to interrupt 408 current flow through first pin 302. Similarly, if the second current exceeds the predetermined threshold, trip mechanism 114 of second circuit protection device 310 is activated 406 to interrupt 408 current flow through second pin 304. When a temperature of either first circuit protection device 308 or second circuit protection device 310 exceeds a temperature threshold, trip mechanism 114 included, in the respective circuit protection device 308 or 310 is activated 406 to interrupt 408 current flow to an associated pin 302 or 304.

In an embodiment in which first circuit protection device 308 is configured to sense current and temperature (i.e., a current-and-temperature-biased bi-metal switch), when it is determined 404 that first circuit protection device 308 indicates and over-current and/or over-temperature condition (i.e., the bi-metal switch opens), current flow to first pin 302 is interrupted 408. Further, in an embodiment in which second circuit protection device 310 is configured to sense current, when it is determined 404 that second circuit protection device 310 indicates an over-current condition, current flow to second pin 304 is interrupted 408.

In a particular embodiment, using output 126 of temperature sensors 128 (shown in FIG. 1) included in first circuit protection device 308 and second circuit protection device 310, controller 312 reads the temperature sensed by the circuit protection devices 308 and 310. As long as the temperatures sensed by both circuit protection devices 308 and 310 remain below a predetermined temperature threshold, controller 312 enables current flow from the power source to a load through junction 301. If a temperature sensed by one or both of circuit protection devices 308 and/or 310 exceeds the predetermined, temperature threshold for an instant or for a predetermined amount of time, indicating abnormally high current draw and/or a short circuit, controller 312 sends a trip signal to circuit protection device 308 and/or 310 that sensed the over-temperature condition, tripping circuit protection device 308 and/or 310 and interrupting 408 the flow of current to circuit protection device 308 and/or 310.

A technical effect of the methods and systems described herein may include one or more of: (a) receiving a signal representing a first current sensed by a first circuit protection device and a second current sensed by a second circuit protection device; (b) determining whether the first current and/or the second current exceeds a predetermined current threshold; and (c) activating a first trip mechanism and/or a second trip mechanism based on the determination.

Exemplary embodiments of circuit protection systems and methods are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the power system as described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for protecting an electrical junction having a first pin and a second pin, said system comprising:
a first circuit protection device coupled to said first pin and configured to sense at least a first current; and
a second circuit protection device coupled to said second pin and configured to sense at least a second current, each of said first circuit protection device and said second circuit protection device comprising:
a trip mechanism configured to interrupt current flowing through a respective circuit protection device; and
a trip unit operatively coupled to said trip mechanism, said trip unit being configured to activate said trip mechanism based on a determination that a respective current exceeds a predetermined threshold,
wherein the first pin is configured to connect to a first hot wire and the second pin is configured to connect to a second hot wire.

2. A system according to claim 1, wherein said first circuit protection device is configured to sense the first current and a first temperature, said trip unit of said first circuit protection device configured to activate said trip mechanism of said first circuit protection device when at least one of the first current exceeds a predetermined current threshold and the first temperature exceeds a predetermined temperature threshold.

3. A system according to claim 1, wherein said second circuit protection device is configured to sense the second current and a second temperature, said trip unit of said second circuit protection device configured to activate said trip mechanism of said second circuit protection device when at least one of the second current exceeds a predetermined current threshold and the second temperature exceeds a predetermined temperature threshold.

4. A system according to claim 1, wherein said first circuit protection device comprises a current sensor and a temperature sensor, said trip unit of said first circuit protection device configured to activate said trip mechanism of said first circuit protection device based on a signal from said temperature sensor that a temperature sensed by said first circuit protection device exceeds a predetermined temperature threshold.

5. A system according to claim 4, wherein said temperature sensor comprises at least one of a bi-metal switch, a thermocouple sensor, and a thermistor.

6. A system according to claim 1, wherein said second circuit protection device comprises a current sensor and a temperature sensor, said trip unit of said second circuit protection device configured to activate said trip mechanism of said second circuit protection device based on a signal from said temperature sensor that a temperature sensed by said second circuit protection device exceeds a predetermined temperature threshold.

7. A system according to claim 1, wherein the electrical junction is a 240V electrical junction.

8. A system according to claim 1, wherein said first circuit protection device is configured to sense the first current and a first temperature and said second circuit protection device is configured to sense only the second current.

9. A system for protecting an electrical junction having a first pin and a second pin, said system comprising:
a first circuit protection device coupled to said first pin, said first circuit protection device comprising a first trip mechanism;

a second circuit protection device coupled to said second pin, said second circuit protection device comprising a second trip mechanism; and a controller coupled to said first circuit protection device and said second circuit protection device, said controller configured to:
  receive a signal representative of an overage event from at least one of said first circuit protection device and said second circuit protection device; and
  activate at least one of said first trip mechanism and said second trip mechanism based on the received signal.

10. A system according to claim 9, wherein the signal representative of an overage event is a temperature signal, said controller further configured to:
  receive the temperature signal representative of an overheating event sensed by at least one of said first circuit protection device and said second circuit protection device; and
  activate at least one of said first trip mechanism and said second trip mechanism based on the temperature signal.

11. A system according to claim 10, further comprising generating the temperature signal using a temperature sensor included in at least one of said first circuit protection device and said second circuit protection device.

12. A system according to claim 10, further comprising generating the temperature signal by at least one of a bi-metal switch, a thermocouple sensor, and a thermistor included in at least one of said first circuit protection device and said second circuit protection device.

13. A system according to claim 9, wherein the signal representative of an overage event is a current signal, said controller further configured to:
  receive the current signal representative of a magnitude of current sensed by at least one of said first circuit protection device and said second circuit protection device; and
  activate at least one of said first trip mechanism and said second trip mechanism based on a determination that the magnitude of the current flow exceeds a predetermined current threshold.

14. A system according to claim 13, wherein said controller further configured to activate at least one of said first trip mechanism and said second trip mechanism based on a determination that the magnitude of the current flow exceeds a predetermined current threshold for a predetermined amount of time.

15. A system according to claim 9, wherein said controller is further configured to:
  receive a first current signal and a temperature signal from said first circuit protection device as the overage signal; and
  receive a second current signal from said second circuit protection device as the overage signal.

16. A system according to claim 15, wherein said controller is further configured to at least one of:
  activate said first trip mechanism when a magnitude of a current represented by the first current signal exceeds a predetermined current threshold;
  activate said first trip mechanism when a temperature represented by the temperature signal exceeds a temperature threshold; and
  activate said second trip mechanism when a magnitude of a current represented by the second current signal exceeds the predetermined current threshold.

17. A method of operating a system for protecting an electrical junction including a first circuit protection device coupled to a first pin of the electrical junction and a second circuit protection device coupled to a second pin of the electrical junction, the first circuit protection device configured to sense at least a first current and the second circuit protection device configured to sense at least a second current, the first circuit protection device having a first trip mechanism and the second circuit protection device having a second trip mechanism, said method comprising:
  receiving a signal representing the first current sensed by the first circuit protection device and the second current sensed by the second circuit protection device;
  determining, by a processor, whether at least one of the first current and the second current exceeds a predetermined current threshold; and
  activating, by the processor, at least one of the first trip mechanism and the second trip mechanism based on the determination,
  wherein the first pin is configured to connect to a first hot wire and the second pin is configured to connect to a second hot wire.

18. A method according to claim 17, further comprising:
  receiving a temperature signal representative of a temperature sensed by at least one of the first circuit protection device and the second circuit protection device;
  determining, by the processor, whether the temperature exceeds a predetermined temperature threshold; and
  activating, by the processor, at least one of the first trip mechanism and the second trip mechanism.

19. A method according to claim 17, wherein receiving the signal representing the first current sensed by the first circuit protection device and the second current sensed by the second circuit protection device comprises receiving a temperature signal representing a temperature sensed by the first circuit protection device.

20. A method according to claim 19, wherein activating, by the processor, at least one of the first trip mechanism and the second trip mechanism comprises at least one of:
  activating the first trip mechanism when a magnitude of the first current exceeds the predetermined current threshold;
  activating the first trip mechanism when the temperature represented by the temperature signal exceeds a temperature threshold; and
  activating the second trip mechanism when a magnitude of the second current exceeds the predetermined current threshold.

* * * * *